(12) United States Patent
Maurice et al.

(10) Patent No.: US 11,072,109 B2
(45) Date of Patent: *Jul. 27, 2021

(54) DEVICE AND PROCESS FOR MARKING AN OPHTHALMIC LENS WITH A PULSED LASER OF WAVELENGTH AND ENERGY SELECTED PER PULSE

(71) Applicant: ESSILOR INTERNATIONAL, Charenton-le-Pont (FR)

(72) Inventors: Sebastien Maurice, Charenton-le-Pont (FR); Frederic Dubois, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 44 days.

This patent is subject to a terminal disclaimer.

(21) Appl. No.: 16/145,266

(22) Filed: Sep. 28, 2018

(65) Prior Publication Data

US 2019/0022921 A1    Jan. 24, 2019

Related U.S. Application Data

(62) Division of application No. 14/917,113, filed as application No. PCT/FR2014/052338 on Sep. 19, 2014, now Pat. No. 10,112,340.

(30) Foreign Application Priority Data

Sep. 20, 2013  (FR) ..................................... 1359081

(51) Int. Cl.
   *B29C 59/16*    (2006.01)
   *B23K 26/06*    (2014.01)
   (Continued)

(52) U.S. Cl.
   CPC .......... *B29C 59/16* (2013.01); *B23K 26/0006* (2013.01); *B23K 26/0622* (2015.10);
   (Continued)

(58) Field of Classification Search
   CPC . B29D 11/00932; B29C 59/16; B23K 26/355; B23K 26/0648; B23K 26/0006; B23K 26/0622; B23K 26/361
   See application file for complete search history.

(56) References Cited

U.S. PATENT DOCUMENTS 7,469,831 B2   12/2008   Gu et al.
9,221,124 B2   12/2015   Albelo et al.
(Continued)

FOREIGN PATENT DOCUMENTS

DE   10 2010 010 337 A1    9/2011
EP           2256576 A1 *  12/2010  ................ G01J 1/50
(Continued)

OTHER PUBLICATIONS

Japanese Office Action for Application No. 2016-543451, dated Sep. 11, 2018, with English translation provided.
(Continued)

*Primary Examiner* — Mathieu D Vargot
(74) *Attorney, Agent, or Firm* — Nixon & Vanderhye

(57) ABSTRACT

A device for marking an ophthalmic lens (3), the lens (3) being made of at least one preset material, includes a laser (1) configured to produce permanent engravings on the lens (3) and configured to emit a focused beam of pulsed ultraviolet laser radiation that includes at least one radiation wavelength ranging between 200 nm and 300 nm, has a pulse length ranging between about 0.1 ns and about 5 ns, and has an energy per pulse ranging between about 5 µJ and
(Continued)

about 100 μJ. A laser marking process configured to produce permanent engravings on an ophthalmic lens (3) via this device is also described.

19 Claims, 2 Drawing Sheets

(51) Int. Cl.
*B29D 11/00* (2006.01)
*B23K 26/352* (2014.01)
*B23K 26/00* (2014.01)
*B23K 26/0622* (2014.01)
*B23K 26/361* (2014.01)
*B23K 103/00* (2006.01)

(52) U.S. Cl.
CPC ........ *B23K 26/0648* (2013.01); *B23K 26/355* (2018.08); *B23K 26/361* (2015.10); *B29D 11/00932* (2013.01); *B23K 2103/30* (2018.08); *B23K 2103/50* (2018.08)

(56) References Cited

U.S. PATENT DOCUMENTS

| | | |
|---|---|---|
| 2001/0037105 A1 | 11/2001 | Lin |
| 2002/0003605 A1 | 1/2002 | Rogers et al. |
| 2007/0199927 A1 | 8/2007 | Gu et al. |
| 2008/0051012 A1 | 2/2008 | Akiyama et al. |
| 2010/0141729 A1 | 6/2010 | Petsch et al. |
| 2014/0197140 A1* | 7/2014 | Unrath ............... B23K 26/03 219/121.62 |

FOREIGN PATENT DOCUMENTS

| | | |
|---|---|---|
| EP | 2 355 270 A2 | 8/2011 |
| JP | H11-156568 | 6/1999 |
| JP | 2000-000682 A | 1/2000 |
| JP | 2003-156667 A | 5/2003 |
| JP | 2007-532319 A | 11/2007 |
| JP | 2008-504964 | 2/2008 |
| JP | 2008-112805 | 5/2008 |
| JP | 2009-000704 A | 1/2009 |
| JP | 2009-538231 | 11/2009 |
| WO | 03/034555 A1 | 4/2003 |
| WO | 2005/110666 A1 | 11/2005 |
| WO | 2006-012124 | 2/2006 |
| WO | 2007-140149 | 12/2007 |

OTHER PUBLICATIONS

International Search Report, dated Dec. 16, 2014, from corresponding PCT application No. PCT/FR2014/052338.
EP Communication, dated May 19, 2017, from related EP application No. 14784316.3.
Office Action issued in Japanese Patent Application No. 2019-124290 dated Aug. 25, 2020 with English translation provided.
Office Action issued in Japanese Patent Application No. 2019-124290 dated May 11, 2021 with English translation provided.

* cited by examiner

DEVICE AND PROCESS FOR MARKING AN OPHTHALMIC LENS WITH A PULSED LASER OF WAVELENGTH AND ENERGY SELECTED PER PULSE

This application is a division of application Ser. No. 14/917,133, filed on Mar. 7, 2016, now U.S. Pat. No. 10,112,340, filed as application number PCT/FR2014/052338 on Sep. 19, 2014.

BACKGROUND OF THE INVENTION

Field of the Invention

The present application relates to a process for marking ophthalmic lenses.

More particularly, it relates to permanent marking, especially of ophthalmic lenses.

Description of the Related Art

It is known that ophthalmic lenses, such as spectacle eyeglasses or a visor for example, are subjected to various manufacturing steps. The manufacturing processes generally employed to obtain a finished lens edged to the shape of a particular frame typically comprise steps in which a face of the ophthalmic lens is provided with markings which are what are referred to as permanent markings.

Technical permanent markings may be formed by engravings, or micro-engravings, representing points or crosses and identifying a particular point (for example the optical center of the ophthalmic lens or the prism reference point for a progressive lens), or axis lines (for example for indicating the horizontal axis along which astigmatism is corrected), or shapes delimiting a particular zone (for example a near vision zone or a far vision zone in the case of a progressive lens).

Likewise, it may be necessary to produce markings relating to the identification of the lens or other permanent markings that are what are referred to as commercial markings, which markings are engraved on a finished lens, or on a varnish, an antireflection stack, or directly on the substrate, after the last steps of the manufacturing process of the finished lens have been carried out.

These technical or commercial permanent markings are often produced on one face, the front or back face, of the ophthalmic lens. The back face is often concave, whereas the front face is often convex, but the inverse is possible.

For example, processes for marking by removal of material are known. Such processes are configured to act on the surface of one face of the lens and to remove therefrom a small amount of material with pulses of a laser ray. Specifically, a marking is generally formed of a series of points (or spots), each spot being produced by one or more pulses of the laser.

Among these processes, thermal processes allowing material to be removed by burning, such as processes implementing carbon dioxide lasers ($CO_2$ lasers), are known. In such a process, the interaction between continuous-wave or pulsed infrared (IR) or near-infrared laser radiation emitted by the laser and a constituent material of the lens absorbing the rays gives rise to the following thermal effects: absorption of the rays by the material, diffusion of heat into the material, melting of the material then vaporization of the material. Thus, if the pulses are relatively long, the amount of material removed is large and a larger voluminal zone of the lens is thermally affected. However, if the material of the lens is thermally affected, its properties are modified. It is therefore generally preferable for the thermally affected zone (TAZ) to be as small as possible. Thermal processes are furthermore often correlated with problems with material deformation at the points of ablation. Specifically, the thermal mechanisms that happen before material is removed are slow enough that the thermally affected zone is large, and therefore zones of deformed material form.

Other example processes for marking by ablation, and in particular photo-ablation, referred to as photochemical processes, such as Excimer laser processes, are also known. In such processes, the interaction of ultraviolet (UV) laser radiation with an absorbing material (generally a polymer) of the lens drives a chemical decomposition mechanism. In contrast to an infrared photon (IR), the energy of an ultraviolent (UV) photon is high enough to break a covalent bond. Thus, the more the material absorbs UV photons, the fewer the thermal effects and vice versa. Irradiation with UV rays further allows the size of the spots to be decreased and the absorption of the rays by the material of the lens to be improved.

Among ablation marking processes, what are referred to as ultrashort marking processes, such as processes employing "femtosecond" ($10^{-15}$ second) or "picosecond" ($10^{-12}$ second) lasers, are also known. In a "picosecond" process, for a pulse duration shorter than 5 ps (picoseconds), there is almost no thermal diffusion outside of the irradiated volume of the lens because the ablated material takes the excess heat with it. For comparison, in a $CO_2$ laser process, the duration of the pulses is about 1 ms (milliseconds). The amount of material removed per pulse in an ultrashort marking process is relatively small but the quality of the marking is improved, especially relative to a thermal process. The pulses generated in ultrashort processes have a high intensity (of about a few $GW/cm^2$, whereas they are about 18 $MW/cm^2$ in an Excimer laser process or about 3 $kW/cm^2$ in a $CO_2$ laser process). These ultrashort pulses thus make it possible, by virtue of a non-linear multiphoton absorption mechanism, to mark transparent materials, dielectrics for example, superficially.

In other words, thermal processes working in the infrared generate a large thermally affected zone, whereas ultrashort processes also working in the infrared, but equally in the visible or ultraviolet, generate a very small thermally affected zone. Excimer laser processes working in the ultraviolet also allow a quite small thermally affected zone to be obtained.

However, Excimer or "Femto" processes are relatively expensive processes. Furthermore, Excimer laser processes have a large environmental impact. $CO_2$ laser processes are much less expensive, but they create problems related to the aforementioned thermal mechanisms.

BRIEF SUMMARY OF THE INVENTION

Thus, the present invention aims to provide a device, the source of which is easy to maintain and less expensive, limiting environmental constraints and allowing an ablation engraving mechanism to be implemented, this device furthermore having other advantages.

To this end, according to a first aspect, a device is provided for marking an ophthalmic lens, said ophthalmic lens being produced from at least one predetermined material, the device including a laser configured to produce permanent engravings on the ophthalmic lens, and being characterized in that the laser is configured to emit a focused pulsed beam of ultraviolet laser radiation, the focused beam having at least the following parameters:

a radiation wavelength comprised between 200 nm and 300 nm;

a pulse duration comprised between about 0.1 ns and about 5 ns; and an energy per pulse comprised between about 5 µJ and about 100 µJ.

One of the major advantages of such a device is to make it possible to produce commercial or technical markings irrespectively on a finished or unfinished surface of the lens.

The invention for example is advantageously applicable to what are referred to as "technical" markings, corresponding to the markings required by standard ISO 8980-2 in paragraph 7.1 and preferably the markings of paragraphs 7.1a) and 7.1 b) and engraved on the material of the substrate of the lens, rapidly after production of the geometry of the lens.

The invention is also for example applicable to commercial markings, such as logos or brand designations or markings corresponding to the markings required by standard ISO 8980-2 in paragraph 7.1c).

The device according to the invention furthermore allows markings to be produced on very different materials.

According to one advantageous embodiment, the focused beam furthermore has at least one of the following parameters:

a pulse frequency comprised between about 100 Hz and about 10 kHz; and/or a peak power comprised between about 2.5 kW and about 1 MW.

According to one advantageous exemplary embodiment, the device is configured so that the focused beam of ultraviolet laser radiation has at least one of the following parameters:

the radiation wavelength of the focused ultraviolet laser beam is comprised between about 230 nm and about 290 nm and preferably about 266 nm; and/or the pulse frequency is comprised between about 100 Hz and about 1 kHz; and/or the peak power is comprised between about 10 kW and about 100 kW; and/or the pulse duration is comprised between about 0.1 ns and about 2 ns; and/or the energy per pulse is comprised between about 10 µJ and about 60 µJ.

The expression "peak power" is here understood to mean the instantaneous power of the laser during a pulse. It is to be contrasted for example with what is referred to as "effective" power, which is an average of the power over time; the latter is therefore generally much lower since it is by definition zero between pulses.

According to one preferred embodiment, the device includes a solid-state laser source configured to emit a pulsed infrared radiation beam, and a multiplier, positioned at the output of the laser source and configured to multiply a radiation frequency of the infrared beam emitted as output from the laser source, preferably by a factor comprised between three and ten.

In the context of the invention, the expression "solid-state laser source" is understood to mean a laser source the gain medium of which, also referred to as the active medium, is either a solid or ionic crystal or an optical fiber. Solid-state laser sources are thus different from lasers having a liquid or gaseous gain medium.

These laser sources are generally easier to maintain and less expensive than laser sources with liquid or gaseous media, such as Excimer sources for example.

The multiplication factor is here chosen as equal to four, but it may, generally, depending on the initial wavelength of the laser source, be a factor comprised between three and ten inclusive and preferably between three and five.

The multiplier is configured to form, by coupling to the laser source, a beam of ultraviolet laser radiation having a wavelength comprised between about 200 nm and about 300 nm, more preferably between about 208 nm and about 220 nm, for example about 213 nm or about 210 nm or about 209.4 nm or even between about 260 nm and about 270 nm, for example about 261.7 nm or about 263 nm or about 266 nm.

The laser source and the multiplier are two elements that may be separate, or contained in the same housing. If needs be, the combination of a solid-state laser and a multiplier in the same housing allows a very compact device to be obtained and therefore one that is transportable and transposable at will, both on a manufacturing line and in the laboratory for example.

Purchase and operating costs (maintenance, lifetime) are moderate relative to existing conventionally used gaseous or liquid medium ultraviolet radiation emitting laser source devices, for example in particular Excimer laser devices, and hence the device according to the invention is particularly simple, easy-to-use and economical.

The laser source is for example an Nd-YAG laser and the multiplier is for example configured to quadruple the frequency of pulses output from the Nd-YAG laser.

An Nd-YAG source may principally emit a beam at the wavelength 1064 nm, thereby making it possible, with coupling to a quadrupler, i.e. a factor-four multiplier, to obtain a beam of laser radiation with a wavelength of about 266 nm, or of about 213 nm with a quintupler, i.e. a factor-five multiplier.

According to one particular exemplary embodiment, the Nd-YAG laser with a multiplier is a Crylas eco mopa UV laser (266 nm).

According to one alternative, the laser source is for example an Nd—YVO4 laser. Such a laser source for example emits radiation of a wavelength of about 1064 nm, which, coupled to a quadrupler, makes it possible to obtain laser beams of wavelength of about 266 nm, or of about 213 nm with a quintupler.

According to another alternative, the laser source is for example an Nd-YLF laser. Such a laser source for example emits radiation of a wavelength of about 1047 nm or radiation of a wavelength of about 1053 nm depending on its operating mode, which, coupled to a quadrupler, makes it possible to obtain laser beams of wavelength of about 262 nm or 263 nm, or even of about 209 nm or 210 nm with a quintupler.

Generally, the source and the multiplier are configured to emit ultraviolet radiation comprised between 10 and 120 µJ.

Preferably here, according to particular arrangements, the laser source is configured to emit a pulsed beam of laser radiation having an energy per pulse comprised between about 30 µJ and about 80 µJ and preferably higher than 40 µJ. The energy of the focused beam of ultraviolet radiation would then be comprised between about 5 µJ and about 65 µJ.

According to one preferred method of implementation, the device includes an optical assembly provided with an F-theta lens, which lens is configured to focus a beam of ultraviolet laser radiation onto a focal plane of the F-theta lens with a focused beam diameter in the focal plane of the order of about 20 µm to about 50 µm, 30 µm for example.

The F-theta lens is for example located at the output of the optical assembly.

Here, the expression "F-theta lens" is understood to mean a flat field lens that by definition has a focal plane at a distance referred to as the focal length. The focal length is for example about 160 mm in one preferred exemplary implementation but may more generally be comprised between 100 mm and 200 mm.

In general, the spot effectively engraved by the beam focused on a surface of the ophthalmic lens has a diameter smaller than that of the focused beam incident on a surface of the ophthalmic lens, which is generally placed in the focal plane. In the present case, the diameter of the engraved spot would for example be 15 µm to 30 µm or thereabouts.

According to one preferred embodiment, the optical assembly includes an energy attenuator configured to regulate a fluence of the beam of ultraviolet radiation focused on a surface of the ophthalmic lens to be marked according to a plurality of operating modes of the attenuator, which modes each define a determined fluence value.

Fluence, as those skilled in the art know, corresponds to the energy per pulse of the beam incident on the surface of the lens per exposed unit area.

In other words, the attenuator has a plurality of operating modes; it is configured to have a plurality of attenuation levels. It is adaptable, i.e. adjustable, either continuously or in increments. Depending on the targeted material of the lens, it is thus possible to adjust the fluence of the beam to be applied, by adjusting here the energy per pulse output from the attenuator.

The operating modes of the attenuator and/or the fluence values determined for the operating modes are defined on the basis of at least one parameter of the material of the ophthalmic lens, which parameter is chosen from a degradation parameter and an absorbance at the wavelength of the ultraviolet radiation.

A performance table is for example obtained by calibrating the attenuator for various materials, for example by engraving a few marks and measuring the visibility obtained for a plurality of fluence values, by eye and using viewing systems such as a video camera, a microscope or even alignment and control machines.

The same device is thus able to produce both technical markings on the substrate of the lens, before or after polishing, and commercial markings on a surface of the finished lens, i.e. after polishing and functional treatments such as HMC (hard multi-coat) treatments or coloring by imbibition, if needs be. Specifically, by means of the attenuator and a performance table giving a visibility and/or marking efficacy for various materials, it is possible to mark very different materials with, each time, an optimal fluence, without changing device or carrying out costly adjustments of the power emitted by the laser source.

Functional treatments are defined in the invention as comprising any treatment providing a useful function to a spectacle wearer and carried out on at least one face of the ophthalmic lens. They here comprise coloring of the surface of the lens, and/or one or more varnishing treatments, and/or possibly also an antireflection treatment.

The treatments referred to as "varnishing" treatments may here comprise the deposition of one or more layers of antishock and/or adhesion promoting varnish, known to those skilled in the art as primers, and of an anti-scratch layer, called a hard coat by those skilled in the art. The varnishing treatments may include, in the context of the invention, possible deposition of an optical impedance matching layer between two varnishes and/or between the substrate and a varnish in order to limit the formation of interference fringes, since this layer is advantageous only if at least one varnish has been deposited on the substrate.

The treatments referred to as "antireflection" treatments may include, in the context of the invention, deposition of a surface treatment of the anti-smudge or anti-fogging type since these layers are often deposited in the same step as the deposition of the antireflection stack.

Thus, it is possible to avoid the need for a plurality of different marking devices by virtue of the adaptability of the attenuator.

The device, and for example the optical assembly, includes a probe configured to calibrate the energy attenuator, which probe is placed between the energy attenuator and the ophthalmic lens to be marked, or even preferably between the F-theta lens and the lens to be marked.

The device is preferably configured to be able to calibrate the attenuator by determining a curve representing an energy per pulse of the focused beam, as a function of an angle of orientation of a polarized filter that the attenuator includes, relative to an axis of polarization of the laser beam for example, for a given energy per pulse at the input of the attenuator.

The calibration is for example carried out during an initial regulation of the attenuator and/or the laser source, and/or during a maintenance operation.

Thus, in an ablation table, an energy per pulse of the focused beam, corresponding to a fluence required at the surface of the lens, is defined, thereby allowing the operating mode of the attenuator to be regulated, and the calibration is carried out by virtue of the at least one probe placed between the attenuator and the ophthalmic lens to be marked, or even preferably placed between the F-theta lens and the lens to be marked.

This for example allows an energy per pulse of the focused beam to be defined depending on the materials of the lens to be engraved, and this value to be maintained over time independently of aging of the source and of various optical components that may decrease the energy. Thus, to mitigate aging of the optical assembly or of the laser source, during a maintenance calibration, it is easy to carry out a re-evaluation of an effective energy incident on the surface of the lens for the operating modes of the attenuator, and to reassign the operating modes to materials of the lens to be engraved depending on this re-evaluation.

According to one method of implementation that is a particularly easy way of decreasing the bulk of the device, the device comprises an afocal system.

The afocal system is for example placed between the laser source and the ophthalmic lens to be marked, and preferably in front of the attenuator, for example between the multiplier and the attenuator.

The afocal system is configured to increase a diameter of the laser beam. For example, the afocal system is configured to triple the diameter of the laser beam. The afocal system may have a fixed structure or have a variable structure allowing the diameter of the laser beam to be varied.

The device is furthermore for example configured to determine a ratio of a beam width output from the afocal system to the focal length of the F-theta lens so as to obtain a desired focused beam diameter on the surface of the ophthalmic lens, for example of the order of about 20 µm to 50 µm.

According to one exemplary embodiment, the optical assembly furthermore includes a scanner head configured to pilot an orientation of the beam of ultraviolet laser radiation toward the F-theta lens, and to pilot a position of the focused laser beam in the focal plane of the F-theta lens.

The spots to be marked are defined and the scanner head is synchronized with the laser pulse frequency in order to illuminate/target in succession all the predetermined spots, one or more times. The scanner head allows the beam to be oriented in order to position the spot to be engraved. Here, the scanner head comprises mirrors, but the beam could be oriented by other means, such as for example a magnetic field.

The device is also preferably configured to receive at least one geometric characteristic of the ophthalmic lens and to determine an altitude of the holder of the lens as a function of the at least one geometric characteristic of the ophthalmic lens and of the focal length of an F-theta lens.

Specifically, from one marking to the next, the lens is moved altitudewise, i.e. along z, so that for each marking to be carried out, the surface to be engraved of the lens is substantially in the focal plane. However, to produce a single marking, it is a scanner head that allows the beam to be oriented in order to produce the various spots and the focused beam to be moved in the focal plane, or at least over the surface of the ophthalmic lens to be marked.

The at least one geometric characteristic is for example representative of a curvature of the surface of the ophthalmic lens to be marked and of a thickness at the center of the lens. The at least one geometric characteristic representative of the curvature of the surface of the ophthalmic lens to be marked and of the thickness at the center of the lens is determined beforehand by modeling/calculation and stored in a surface file or is measured by optical or mechanical probing.

For this purpose, the device optionally includes an optical or mechanical probe configured to measure this geometric characteristic.

Optionally, the fluence is adjusted by acting on the width of the beam. For example, the fluence is maximal with a minimal cross section, i.e. a minimal focused beam width on the surface of the ophthalmic lens to be marked. The focus on the surface of the ophthalmic lens to be marked is checked by modifying the average altitude of the ophthalmic lens, i.e. the position of the holder vertically. The focal length of the F-theta lens is for its part fixed since it is an intrinsic geometric property of the F-theta lens.

For this purpose, the device includes, for example, a mechanism for adapting a distance between the optical assembly and a holder of the ophthalmic lens to be marked, which adapting mechanism is configured to modify an altitude of the ophthalmic lens to be marked.

According to one exemplary implementation, at least one of the engravings defines a marking formed by a plurality of spots produced at a distance from one another with a predetermined separation between two consecutive spots. Specifically, a marking may be formed only of a single spot, but if it includes at least two spots, two consecutive spots are then distanced from each other by a determined separation.

The separation is for example determined by a rendered visibility test, and by determining a maximum possible separation. It is generally fixed between about 50 µm and 150 µm, and preferably about 50 µm.

According to one exemplary implementation, at least one of the engravings defines a technical marking on a surface of the ophthalmic lens, which ophthalmic lens has a predetermined prescription.

According to yet another exemplary implementation, at least one of the engravings defines a commercial marking on a surface of the ophthalmic lens, which ophthalmic lens has a predetermined prescription and optionally a functional treatment.

Lastly, the marking is optionally verified and, depending on the result of this verification, a correction is applied to the marking. The verification of the marking for example comprises an evaluation of visibility.

For this purpose, the device is configured to carry out a verification of the markings. And, depending on the result of this verification, the device is furthermore configured to correct this or these markings.

According to another aspect, a process is also provided for marking an ophthalmic lens produced from at least one predetermined material, the process being implemented by a device such as defined above, and the process including a step of laser marking permanent engravings on the ophthalmic lens, which marking step includes a step of emitting a focused pulsed beam of ultraviolet laser radiation having at least the following parameters:

a radiation wavelength comprised between 200 nm and 300 nm;

a pulse duration comprised between about 0.1 ns and about 5 ns; and an energy per pulse comprised between about 5 µJ and about 100 µJ.

Since the process according to the invention falls within the category of processes by ablation of material, it thus allows the problems associated with material deformations to be limited.

The process allows markings to be produced on a large number of possible constituent materials of ophthalmic lenses and both a precise marking and a small zone of thermally affected material to be obtained.

In addition, the marking of the ophthalmic lens may thus be carried out indifferently before or after polishing of the lens, or even after varnishing if needs be, without this affecting the quality of the marking or the marking affecting the quality of the polishing or varnishing applied to the lens.

For example, the at least one engraving is produced on a surface of the ophthalmic lens, which ophthalmic lens has a predetermined prescription and said surface is devoid of functional treatment.

In other words, the ophthalmic lens having a predetermined prescription includes a substrate, with or without functional treatments, and at least one of the engravings is engraved directly on a surface of the substrate.

The term "prescription" may moreover mean a zero prescription.

Of course, such a process is usable further upstream during manufacture of a lens, such as for example on an ophthalmic lens during machining of at least one face not yet having a predetermined prescription.

In addition, the at least one engraving is for example produced on the surface of the ophthalmic lens, which ophthalmic lens has a predetermined prescription and is provided with at least one functional treatment.

The process furthermore comprises all or some of the steps corresponding to the configurations of the device presented above, providing analogous advantages.

BRIEF DESCRIPTION OF THE DRAWINGS

Other features and advantages of the present invention will become more clearly apparent on reading the description given with reference to the appended figures, which are given by way of nonlimiting indication, and in which.

DETAILED DESCRIPTION OF THE PREFERRED EMBODIMENTS

Figure 1:
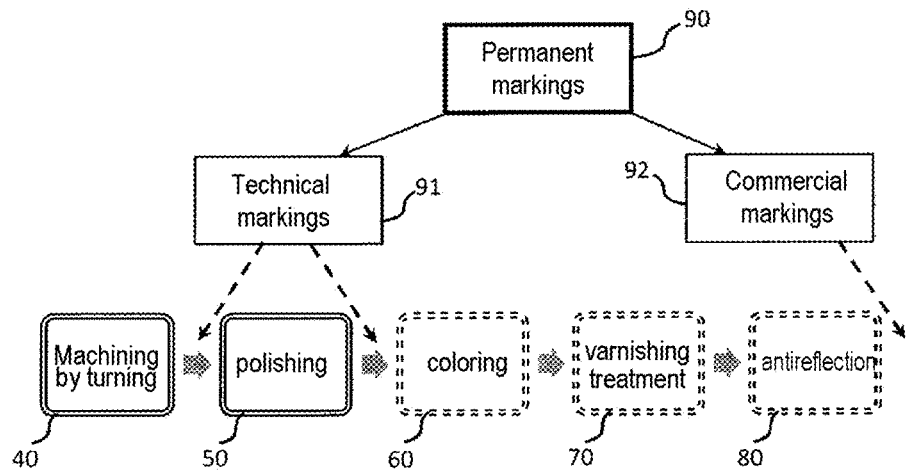
FIG. 1 illustrates the order of various steps of a process for manufacturing a lens.

FIG. 1 schematically shows the principle production steps of an ophthalmic lens.

A substrate is first produced according to a preestablished prescription, for example being machined by turning in step 40.

Here the term "substrate" refers to a body of the ophthalmic lens. A substrate conventionally has one edge and two surfaces that are separated from each other by the edge. Conventionally, one face, called the back face, is often concave, whereas the other face, called the front face, is often convex, but the inverse is possible.

After machining, the faces of the lens are polished in step 50.

Next, the lens optionally receives one or more what are called functional treatments on at least one of its faces, often on the back face, such as for example a coloring treatment in step 60, and/or one or more varnishing treatments in step 70, and/or possibly also an antireflection treatment in step 80.

The treatments referred to as "varnishing" treatments are such as defined above.

The treatments referred to as "antireflection" treatments are here such as defined above.

After polishing, or even after the last of the aforementioned functional treatments if the lens receives one or more thereof, the lens is finished.

The edge of the lens is given the shape of a frame for which it is intended either before polishing, or before functional treatment but after polishing, or generally after the functional treatments, when the lens is finished.

By virtue of a device and process according to the invention, details of which will be given below, it is possible to produce, in step 90, permanent markings during the manufacturing process of the lens.

It is for example not only possible to produce technical markings before or after the polishing in step 91, i.e. before the functional treatments, but also commercial markings in step 92 once the lens has been finished, i.e. either after polishing if the lens receives no functional treatments or after the last functional treatment step if the lens receives one or more functional treatments, such as on the varnish for example if the lens has undergone varnishing.

The term "marking" is here understood to mean the result of engraving of an ophthalmic lens, referred to here as the ophthalmic lens to be marked, so as to form a marking. A marking step may allow a plurality of markings to be produced; for example, in the context of technical markings, there are at least two markings positioned at 34 mm from each other, equidistant relative to a fitting point of the lens, and forming a horizontal axis of the ophthalmic lens.

Each marking is formed of at least one point or spot. If a marking comprises at least two spots, i.e. a plurality of spots, two consecutive spots are distanced from each other by a predetermined distance/separation.

Each spot, for its part, is produced by at least one pulse of laser radiation at a precise location or by a plurality of pulses, i.e. at least two pulses.

Figure 2:
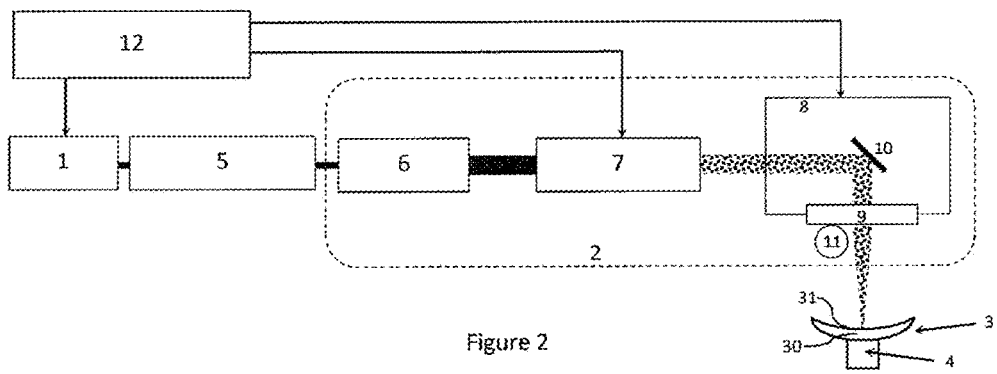
FIG. 2 schematically shows a marking device according to one exemplary embodiment of the invention.

FIG. 2 schematically shows a device according to one embodiment of the present invention, especially allowing the marking step 90 of the process described above to be implemented.

The device mainly includes a laser source 1 and an optical assembly 2.

The laser source 1 emits a pulsed beam of infrared radiation.

The optical assembly 2 allows for its part the beam of laser radiation to be focused so as to allow the desired engraving to be produced on a surface 31 of an ophthalmic lens 3, made of at least one predetermined material, which lens 3 is positioned on a holder 4.

Conventionally, it is therefore the last layer that is engraved, for example especially the substrate or varnish depending on the circumstances.

Dependent thereon, the lens is positioned in the frame of reference of the device differently.

To produce a marking, the device is configured to emit a focused beam of ultraviolet radiation and advantageously with the following parameters:

- a radiation wavelength comprised between 200 nm and 300 nm, or even between about 230 nm and about 290 nm, preferably between about 208 nm and about 220 nm, for example about 209 nm or about 210 nm or about 213 nm, or alternatively more particularly between about 260 nm and about 270 nm, for example about 261.7 nm or about 263 nm or about 266 nm;
- a pulse duration comprised between about 0.1 ns and about 10 ns, or even preferably between about 0.1 and about 5 ns or even 2 ns; and
- an energy per pulse at the focal point comprised between about 5 μJ and about 100 μJ, or even between about 10 μJ and about 80 μJ, or even between about 10 μJ and about 65 μJ; and
- an energy per pulse emitted by the source is then comprised between about 20 μJ and about 120 μJ, preferably between about 30 μJ and about 80 μJ, and preferably higher than 35 μJ, or even higher than 40 μJ, or indeed even between about 40 μJ and about 60 μJ.

Advantageously, the device is also configured to have a high peak power, i.e. between about 2.5 kW and about 1 MW, or even between about 20 kW and about 50 kW, and/or a pulse frequency comprised between about 100 Hz and about 10 kHz.

The laser source 1 thus emits pulses with a determined energy per pulse, at a given pulse frequency, for a given wavelength. The pulse duration is generally fixed by the design of the laser source. Thus, the pulse frequency and the duration of each pulse induce a low average power, while having a high peak power.

In one particular example, the device is configured to emit ultraviolet radiation and advantageously with the following parameters:

- a radiation wavelength of about 266 nm;
- a pulse frequency of about 1 kHz;
- a pulse duration of about 1 ns; and
- an energy per pulse at the focal point comprised between about 10 μJ and about 25 μJ depending on the material engraved.

For example, the laser source is then configured to emit pulses having an energy per pulse, before an attenuator, comprised between 40 μJ and 60 μJ.

For example:

for an Orma® lens, which is mainly composed of a CR39 polymer, a spot is generally marked by eight pulses at an energy per pulse of about 25 µJ on the surface to be marked;

for a polycarbonate, a spot is generally marked by one pulse at an energy per pulse of about 15 µJ on the surface to be marked;

for a material of refractive index value of about 1.74, a spot is generally marked by three pulses at an energy per pulse of about 10 µJ on the surface to be marked;

for the material called Stylis®, generally having a refractive index value of 1.67, a spot is generally marked by one pulse at an energy per pulse of about 25 µJ on the surface to be marked;

for the material called Ormix®, of refractive index generally equal to about 1.6, a spot is generally marked by two pulses at an energy per pulse of about 15 µJ on the surface to be marked; and for a marking on an HMC varnish, with a view to creating a visible marking, a spot is generally marked by ten pulses at an energy per pulse of about 25 µJ, and for a faint marking, in order to mark an anti-smudge coating and/or antifog coating, by one pulse at an energy of about 10 µJ.

Of course, with such a device the energy per pulse could be much higher.

To this end, the laser source 1 of the device according to the invention includes a solid-state laser that emits a pulsed beam of infrared radiation. Such a laser especially has the advantage of being inexpensive for high peak powers, and induces very little or even no environmental constraints. Furthermore, its maintenance is simple.

The expression "solid-state laser" is understood to mean a laser the excitation medium of which is defined in opposition to lasers having a gaseous or liquid excitation medium. What is meant is that the excitation medium is either a solid or ionic crystal or an optical fiber.

One particularly advantageous such source is for example an Nd-YAG laser that emits principal radiation at a wavelength of about 1064 nm.

To obtain ultraviolet radiation from a laser source emitting infrared radiation, the device here includes a multiplier 5 that is positioned at the output of the laser source 1. The multiplier 5 allows the radiation frequency of the laser radiation emitted by the laser source 1 to be multiplied, generally by a factor comprised between three and ten. The multiplier is chosen, depending on the wavelength emitted by the laser source, so as to obtain, as output from the multiplier, ultraviolet radiation that is able to be absorbed by the material and that is sufficiently energetic to destroy chemical bonds of the material of the lens, while using optical components that allow a suitable pulse frequency and duration to be achieved.

In the case of an Nd-YAG laser emitting radiation the frequency of which corresponds to a wavelength of 1064 nm, it is for example then necessary to quadruple its radiation frequency. More precisely, at the output of a factor-four multiplier, the radiation will have a radiation frequency corresponding to a wavelength of about 266 nm.

In the present exemplary embodiment, the multiplier 5 is positioned between the laser source 1 and the optical assembly 2.

In practice, the laser source 1 and the multiplier 5 may for example be contained in the same housing, or be two separate elements to be juxtaposed on an optical line of the device. If needs be, the combination of the laser source and a multiplier in the same housing provides a system, referred to as a "laser system" for convenience, that is possibly very compact.

In the present exemplary embodiment, the optical assembly 2 includes an afocal system 6, an attenuator 7, a scanner head 8 and an F-theta lens 9.

The afocal system 6, the attenuator 7, the scanner head 8 and the F-theta lens 9 are here on the whole mounted in series.

The afocal system 6 is an optical system allowing the radiation beam that is delivered thereto to be enlarged. In this case, it allows its cross section and its diameter to be tripled. For example, the beam of ultraviolet radiation output from the multiplier has a diameter "d". It enters into the optical assembly 2 via the afocal system 6. At the output of the afocal system 6 it therefore has a diameter "3×d", i.e. a tripled diameter. The afocal system could also have a different enlargement factor, for example comprised between two and ten.

Here, the afocal system 6 is fixed, i.e. the same enlargement factor is always applied to a beam of given diameter. This is due to the composition of the afocal system 6. However afocal systems the enlargement factor of which is adjustable, i.e. variable, do exist. One of the advantages related to the use of a fixed afocal system is that a simpler and less costly structure is achieved.

At the output of the afocal system 6, the ultraviolet irradiation enters into the attenuator 7.

The attenuator 7 mainly allows a fluence to be regulated. The fluence is expressed in $J/cm^2$ for example. It is the amount of energy (in J) per pulse incident on the surface of the ophthalmic lens to be marked per unit area (in $cm^2$ for example).

The attenuator 7 here has the particularity of being adaptable.

In other words, the attenuator 7 here has a plurality of operating modes; it is configured to have a plurality of attenuation levels. The variation is for example either continuous or incremental. It is thus possible to adjust the energy of the beam depending on the material of the lens to be marked.

The optical assembly 2 thus has an optical path (after the frequency multipliers 5), i.e. between the afocal system 6 and the F-theta lens 9, that has a degree of energy transmission of about 80% to 90%, and that may decrease as the optical assembly ages. However to engrave, by ablation, very different materials, and above all in order to allow the same fluence to be produced on the surface of the lens for a given focused beam diameter on the surface of the lens despite of aging of the source or of the optical path, it is necessary to be able to control the fluence over time. To do this, either the laser source is reconfigured to emit a radiation beam at another energy level, or it is then judicious to have an adaptable attenuator (adaptable in the sense adjustable) mounted in series at the output of the laser source so as to make it possible to adapt the energy of the radiation emitted by the laser source. Here, the laser source 1 is preferably a fixed-energy source, this making the device more economical. It is then preferable to provide an adaptable attenuator 7 in compensation.

The fluence is determined so as to be high enough to achieve an ablation marking mechanism as a function of at least one predetermined parameter of the material of the ophthalmic lens. The parameter of the material on the basis of which the fluence is determined is for example chosen from a degradation parameter and an absorbance at the marking wavelength. To this end, for example, a performance table may be produced by calibrating the device for various commonly used materials, for example by producing a few engravings on test substrates and by measuring a fluence corresponding to a rendered visibility, both with the naked eye and by way of viewing systems such as a video camera, a microscope, or even alignment/control machines.

The performance table for example allows an operating mode of the attenuator to be paired with a type of material to be engraved or an energy at the focal point to be paired with a material to be engraved.

Pairing an energy at the focal point with a material to be engraved is a more advantageous option since it is not necessary to remake the performance table for each material as the system ages; it is enough to redo an attenuator energy/operating mode calibration, which is easier. However, this option requires that it be possible to measure the energy at the focal point per pulse.

According to one advantageous alternative, the performance table may also be produced by measuring a visibility of a marking on said material for a pulse energy and/or a given operating mode of the attenuator and measuring a deformation induced by the marking.

Thus, the determination of the value to be applied may be based on charts and/or tables of values indicating the fluence required for a given material and knowledge of the fluences allowed by the various operating modes. The operating mode of the attenuator 7 is chosen depending thereon.

In the case of an adaptable attenuator 7, the device, and here the optical assembly 2 in particular, includes a probe 11.

The probe 11 is placed between the attenuator 7 and the ophthalmic lens 3 to be marked, and here between the F-theta lens 9 and the lens 3 to be marked. The probe 11 is especially configured to calibrate the attenuator 7 and/or to calibrate a system comprising the laser source 1 and the attenuator 7, by measuring the energy per pulse output from the F-theta lens, which is substantially identical to the energy at the focal point, as a function of the energy per pulse issued from the laser source 1 and of an operating mode of the attenuator 7.

After exiting the attenuator 7, the beam passes through the scanner head 8. The scanner head 8 makes it possible to pilot an orientation of the laser beam in the direction of the F-theta lens 9, and a position of the focused laser beam in a focal plane of the F-theta lens 9. The spots to be marked are defined and the scanner head is synchronized with the laser pulse frequency in order to illuminate/target in succession predetermined locational points corresponding to the spots to be marked.

To do this, the scanner head 8 here comprises mirrors 10 to orient the beam, but the beam could be oriented by other means, such as for example a magnetic field.

After exiting the scanner head 8, the beam here passes through the F-theta lens 9.

An F-theta lens is a flat field lens forming a focal plane. If thus allows the beam to be focused in the focal plane with a determined beam diameter in the focal plane, thereby allowing the spots to be produced with a wanted diameter.

The F-theta lens 9 is here located at the output of the optical assembly 2. Furthermore, in the present case, it is located just above the ophthalmic lens 3 to be marked.

In the present exemplary embodiment, the F-theta lens 9 has a focal length of about 160 mm.

The optical assembly 2 is thus configured to focus the beam of ultraviolet laser radiation onto the surface of the lens 3 for example with a focused beam diameter on the surface of the ophthalmic lens 3, when said surface is positioned in the focal plane of the F-theta lens, of the order of about 20 µm to about 50 µm. This for example makes it possible to obtain a marked spot of a diameter of about 15 to about 30 µm.

Thus, to produce a marking, the various spots, if a plurality of spots are required, are produced by modifying the orientation of the beam by virtue of the scanner head 8.

If various markings are to be produced, it is the position of the lens 3 to be marked that is then modified.

To do this, the device furthermore for example includes a mechanism (not shown) for adapting the distance between the optical assembly 2 and the holder 4 of the ophthalmic lens 3 to be marked, in order to allow the altitude of the lens 3 to be modified during the marking process, if the latter includes the production of a plurality of markings.

The device lastly preferably includes a computer and a controller, forming a command/control unit 12.

The command/control unit 12 includes systematic elements configured to execute a computer program in order to implement each of the steps of a marking process, including predetermined operating parameters in order to emit the pulses of ultraviolet laser radiation with the aforementioned parameters, namely:
 a radiation wavelength comprised between 200 nm and 300 nm after multiplication forming a beam of ultraviolet radiation;
 a pulse frequency is comprised between about 100 Hz and about 10 kHz;
 a pulse duration comprised between about 0.1 ns and about 5 ns;
 an energy per pulse comprised between about 5 µJ and about 100 µJ; and
 a peak power comprised between about 2.5 kW and about 1 MW.

Thus, the device presented above allows the various steps of the following process to be implemented.

Figure 3:
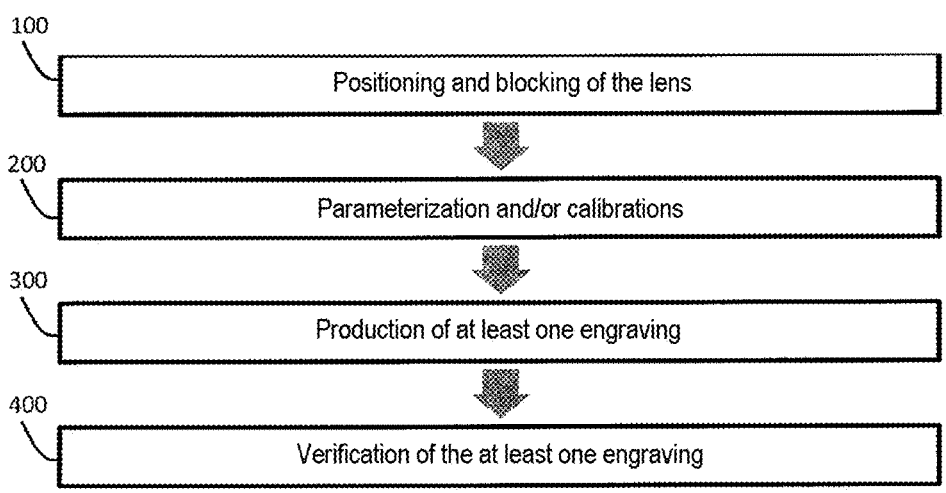
FIG. 3 shows a block diagram of a marking process according to one embodiment of the present invention.

As illustrated in FIG. 3, the marking of an ophthalmic lens (steps 90 to 92), such as the ophthalmic lens 3, for example includes the following steps:
 a step 100 of positioning and blocking the lens;
 a step 200 of parameterizing and/or of performing calibrations;
 at least one step 300 of producing at least one engraving; and
 at least one step 400 of verifying the at least one engraving.

If a plurality of engravings are required, the position of the lens is adjusted, and the following engraving is produced. The calibration and parameterizing steps then become optional.

Figure 4:
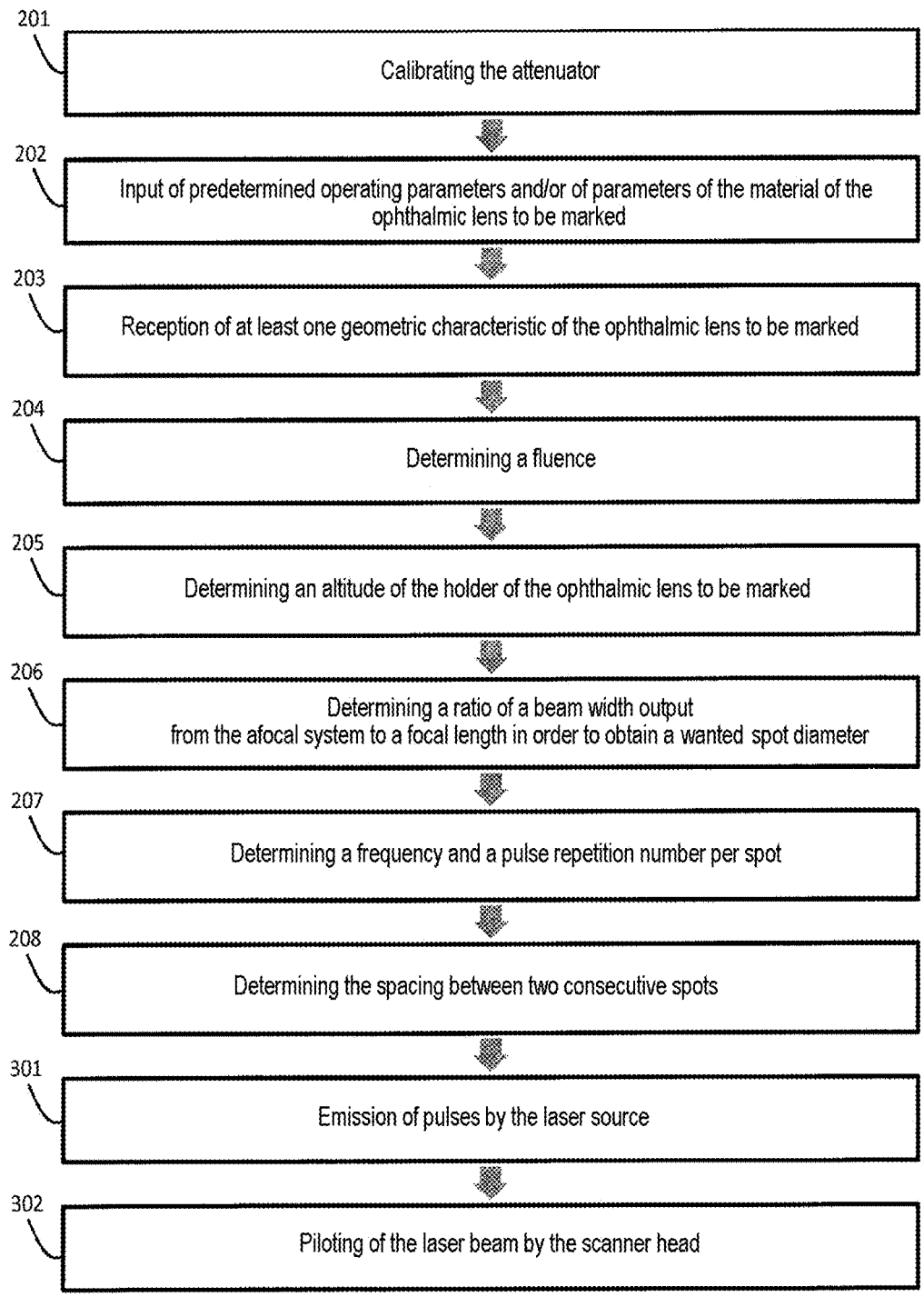
FIG. 4 shows various operating steps of the marking process illustrated in FIG. 3.

FIG. 4 shows operating steps of the process illustrated in FIG. 3.

In this example, the device is configured:
 in step 201, to calibrate the attenuator 7 at least using the probe 11,
 in step 202, to receive predetermined operating parameters and/or parameters of the material of the ophthalmic lens 3 to be marked;
 in step 203, to receive at least one geometric characteristic of the ophthalmic lens 3 to be marked;
 in step 204, to determine a fluence;
 in step 205, to determine an altitude of the holder of the ophthalmic lens 3 to be marked;
 in step 206, to determine a ratio of a beam width output from the afocal system 6 to a focal length of the F-theta lens 9 in order to obtain a wanted spot diameter;
 in step 207, to determine a pulse frequency and a pulse repetition number per spot;

in step 208, to determine a spacing between two consecutive spots;
in step 301, to emit pulses using the laser source 1; and
in step 302, to pilot the laser beam using the scanner head 8.

The invention claimed is:

1. A process for marking an ophthalmic lens produced from at least one predetermined material, the process being implemented by a device including a laser and an energy attenuator, the process comprising:
   laser marking permanent engravings on the lens using the laser, the marking including emitting, by the laser through the energy attenuator, a focused pulsed beam of ultraviolet laser radiation having at least the following parameters:
      a radiation wavelength comprised between 200 nm and 300 nm,
      a pulse duration comprised between about 0.1 ns and about 5 ns,
      an energy per pulse of the pulsed beam of laser radiation comprised between about 20 µJ and about 120 µJ, and
      an energy per pulse at the focal point comprised between about 10 µJ and about 80 µJ; and
   calibrating the energy attenuator by a probe placed between the energy attenuator and the ophthalmic lens.

2. The process as claimed in claim 1, wherein the energy per pulse at the focal point is comprised between about 10 µJ and about 65 µJ.

3. The process as claimed in claim 2, wherein the energy per pulse at the focal point is comprised between about 10 µJ and about 60 µJ.

4. The process as claimed in claim 1, wherein the focused beam of ultraviolet laser radiation has a peak power comprised between about 2.5 kW and about 1 MW.

5. The process as claimed in claim 4, wherein the peak power is comprised between about 10 kW and about 100 kW.

6. The process as claimed in claim 1, wherein the focused beam of ultraviolet laser radiation has a pulse frequency comprised between about 100 Hz and about 10 kHz.

7. The process as claimed in claim 6, wherein the pulse frequency is comprised between about 100 Hz and about 1 kHz.

8. The process as claimed in claim 1, wherein the pulse duration is comprised between about 0.1 ns and about 2 ns.

9. The process as claimed in claim 1, wherein the radiation wavelength of the focused ultraviolet laser beam is comprised between about 230 nm and about 290 nm.

10. The process as claimed in claim 1, wherein the energy per pulse emitted by the laser is comprised between about 30 µJ and about 80 µJ.

11. The process as claimed in claim 10, wherein the energy per pulse emitted by the laser is comprised between about 35 µJ and about 80 µJ.

12. The process as claimed in claim 11, wherein the energy per pulse emitted by the laser is comprised between about 40 µJ and about 60 µJ.

13. The process as claimed in claim 1, further comprising focusing a beam of ultraviolet laser radiation onto a focal plane of an F-theta lens with a focused beam diameter in the focal plane of the order of about 20 µm to about 50 µm.

14. The process as claimed in claim 13, further comprising regulating, by an energy attenuator, a fluence of the beam of ultraviolet radiation focused on a surface of the ophthalmic lens to be marked according to a plurality of operating modes of the attenuator, the plurality of modes each defining a determined fluence value.

15. A process for marking an ophthalmic lens produced from at least one predetermined material, the process being implemented by a device including a laser and an energy attenuator, the process comprising:
   laser marking permanent engravings on the lens using the laser, the marking including emitting, by the laser through the energy attenuator, a focused pulsed beam of ultraviolet laser radiation having at least the following parameters:
      a radiation wavelength comprised between 200 nm and 300 nm,
      a pulse duration comprised between about 0.1 ns and about 5 ns,
      an energy per pulse of the pulsed beam of laser radiation comprised between about 20 µJ and about 120 µJ, and
      an energy per pulse at the focal point comprised between about 10 µJ and about 80 µJ; and
   calibrating the energy attenuator by determining a curve representing the energy per pulse of the pulsed beam, as a function of an angle of orientation of a polarized filter relative to an axis of polarization of the pulsed beam to define the energy per pulse and regulating an operating mode of the energy attenuator based on the defined energy per pulse.

16. The process as claimed in claim 1, wherein the energy attenuator includes a polarized filter, the probe is placed between an F-theta lens and the ophthalmic lens, and the energy attenuator is calibrated by measuring the energy per pulse output from the F-theta lens, as a function of the energy per pulse issued from the laser and of an operating mode of the energy attenuator.

17. The process as claimed in claim 1, wherein the calibrating is carried out during one or more of (i) an initial regulation of one or more of the energy attenuator and the laser, and (ii) during a maintenance operation.

18. The process as claimed in claim 1, further comprising verifying the marking and correcting the marking depending on a result of the verifying.

19. The process as claimed in claim 18, wherein the verifying comprises evaluating a visibility of the marking.

* * * * *